(12) United States Patent
Ho

(10) Patent No.: US 8,902,927 B2
(45) Date of Patent: Dec. 2, 2014

(54) MEDIUM ACCESS CONTROL HEADER FORMAT

(75) Inventor: Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1351 days.

(21) Appl. No.: 12/241,405

(22) Filed: Sep. 30, 2008

(65) Prior Publication Data

US 2009/0141670 A1    Jun. 4, 2009

Related U.S. Application Data

(60) Provisional application No. 60/976,764, filed on Oct. 1, 2007.

(51) Int. Cl.
    *H04J 3/24*      (2006.01)
    *H04W 28/06*     (2009.01)
    *H04W 80/02*     (2009.01)

(52) U.S. Cl.
    CPC ............ *H04W 28/06* (2013.01); *H04W 80/02* (2013.01)
    USPC ............ 370/474; 370/392; 370/470; 370/476

(58) Field of Classification Search
    None
    See application file for complete search history.

(56) References Cited

U.S. PATENT DOCUMENTS

| 7,349,434 B2 | 3/2008 | Kim et al. | |
| 7,792,149 B2* | 9/2010 | Hwang et al. | 370/476 |
| 2003/0036404 A1* | 2/2003 | Adachi et al. | 455/522 |
| 2003/0147371 A1* | 8/2003 | Choi et al. | 370/341 |
| 2004/0017823 A1 | 1/2004 | Kim et al. | |
| 2005/0152290 A1 | 7/2005 | Sakusabe | |
| 2006/0083234 A1* | 4/2006 | Sung et al. | 370/389 |
| 2006/0140158 A1* | 6/2006 | Terry | 370/335 |
| 2007/0041378 A1* | 2/2007 | Ihm et al. | 370/389 |
| 2007/0195762 A1* | 8/2007 | Choi et al. | 370/389 |

FOREIGN PATENT DOCUMENTS

| EP | 0991208 A2 | 4/2000 |
| JP | 2005176075 A | 6/2005 |
| JP | 2008526093 A | 7/2008 |
| RU | 2298878 C2 | 5/2007 |
| WO | 0152565 A2 | 7/2001 |
| WO | WO2004042987 A1 | 5/2004 |
| WO | WO2005006599 A1 | 1/2005 |

(Continued)

OTHER PUBLICATIONS

"3rd Generation Partnership Project; Technical Specification Group Radio Access Network; Medium Access Control (MAC) protocol specification" (Release 7), 3GPP Specification 25.321 v7.5.0 (Jun. 2007), § 9.2.1.

International Search Report and the Written Opinion—PCT/US2008/078455, International Search Authority—European Patent Office—Apr. 29, 2009.

(Continued)

*Primary Examiner* — Andrew Chriss
*Assistant Examiner* — Salvador E Rivas
(74) *Attorney, Agent, or Firm* — Tyler J. Overall

(57) ABSTRACT

Systems and methodologies are described that facilitate employing a variety of medium access control (MAC) header formats in wireless communications. The MAC header formats can be specialized for a particular type of data included in a protocol data unit (PDU). In addition, the MAC headers can have a variable length to accommodate payloads of varying sizes without incurring unnecessary overhead. Further, mechanisms are provided to enable direct access and delivery of control PDUs to associated protocol layers to ensure better quality of service treatment.

28 Claims, 11 Drawing Sheets

(56) References Cited

FOREIGN PATENT DOCUMENTS

| | | |
|---|---|---|
| WO | WO2006071052 A1 | 7/2006 |
| WO | WO2006110072 | 10/2006 |
| WO | WO2007060505 A2 | 5/2007 |

OTHER PUBLICATIONS

Ericsson, "MAC header structure", 3GPP Tdoc R2-073219, 3GPP, Aug. 20, 2007, pp. 1-8.

Taiwan Search Report—TW097137819—TIPO—Oct. 24, 2012.

* cited by examiner

US 8,902,927 B2

MEDIUM ACCESS CONTROL HEADER FORMAT

CROSS-REFERENCE TO RELATED APPLICATIONS

This application claims the benefit of U.S. Provisional Patent application Ser. No. 60/976,764 entitled "LONG TERM EVOLUTION MAC HEADER FORMAT OPTIMIZED DESIGN" which was filed Oct. 1, 2007. The entirety of the aforementioned application is herein incorporated by reference.

BACKGROUND

I. Field

The following description relates generally to wireless communications, and more particularly to an optimized design of a medium access control header format.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

MIMO systems commonly employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, which may be referred to as spatial channels, where $N_S \leq \{N_T, N_R\}$. Each of the $N_S$ independent channels corresponds to a dimension. Moreover, MIMO systems may provide improved performance (e.g., increased spectral efficiency, higher throughput and/or greater reliability) if the additional dimensionalities created by the multiple transmit and received antennas are utilized.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with utilizing a plurality of medium access control (MAC) header formats in wireless communications The MAC header formats can be specialized for a particular type of data included in a protocol data unit (PDU). In addition, the MAC headers can have a variable length to accommodate payloads of varying sizes without incurring unnecessary overhead. Further, mechanisms are provided to enable direct access and delivery of control PDUs to associated protocol layers to ensure better quality of service treatment.

According to related aspects, a method that facilitates employing a plurality of medium access control header formats is provided. The method can comprise determining type of data included in an associated medium access control protocol data unit. The method can also include generating a medium access control header in accordance with a header format that corresponds to the determined type of data. In addition, the method can comprise transmitting the medium access control header and the associated protocol data unit.

Another aspect relates to a communications apparatus that facilitates utilizing variable medium access control headers. The communications apparatus can include means for determining type of data included in an associated protocol data unit. The communications apparatus can also comprise means for generating a medium access control header in accordance with a header format that corresponds to the determined type of data. In addition, the communications apparatus can include means for means for transmitting the medium access control header and the associated protocol data unit.

Yet another aspect relates to a wireless communications apparatus. The wireless communications apparatus can include a memory a memory that retains instructions related to determining type of data included in an associated medium access control protocol data unit wherein the type of data includes at least one of control data, user data or pad data, generating a medium access control header in accordance with a header format that corresponds to the determined type of data and transmitting the medium access control header and the associated protocol data unit. In addition, the wireless communications apparatus can further comprise a processor, coupled to the memory, configured to execute the instructions retained in the memory.

Still another aspect relates to a computer program product, which can have a computer-readable medium. The computer-readable medium can include code for causing at least one computer to determine type of data included in an associated medium access control protocol data unit wherein the type of data includes at least one of control data, user data or pad data. The computer-readable medium can also comprise code for causing at least one computer to generate a medium access control header in accordance with a header format that corresponds to the determined type of data. In addition, the computer-readable medium can include code for causing at least one computer to transmit the medium access control header and the associated protocol data unit.

Another aspect described herein relates to a method that facilitates communicating with variable medium access control header formats. The method can include receiving a medium access control protocol data unit and an associated header. The method can also comprise determining a type of data included the packet data unit based at least in part on a logical channel identifier in the associated header. In addition, the method can include evaluating the medium access control protocol data unit in accordance with the type of data and one or more protocol layers.

Still yet another aspect relates to a communications apparatus that facilitates communicating with variable medium access control header formats. The communications apparatus can include means for receiving a medium access control protocol data unit and an associated header. The communications apparatus can also comprise means for determining a type of data included the packet data unit based at least in part on a logical channel identifier in the associated header. In addition, the communications apparatus can include means for evaluating the medium access control protocol data unit in accordance with the type of data and one or more protocol layers.

A further aspect described herein relates to a wireless communications apparatus that can comprise a memory. The memory can retain instructions related to receiving a medium access control protocol data unit and an associated header, determining a type of data included the packet data unit based at least in part on a logical channel identifier in the associated header wherein the type of data can be at least one of control data, user data or pad data and evaluating the medium access control protocol data unit in accordance with the type of data and one or more protocol layers. In addition, the wireless communications apparatus can also include a processor, coupled to the memory, configured to execute the instructions retained in the memory.

Still another aspect relates to a computer program product, which can have a computer-readable medium that includes code for causing at least one computer to receive a medium access control protocol data unit and an associated header. The computer-readable medium can also comprise code for causing at least one computer to determine a type of data included the packet data unit based at least in part on a logical channel identifier in the associated header wherein the type of data can be at least one of control data, user data or pad data. In addition, the computer-readable medium can include code for causing at least one computer to evaluate the medium access control protocol data unit in accordance with the type of data and one or more protocol layers.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
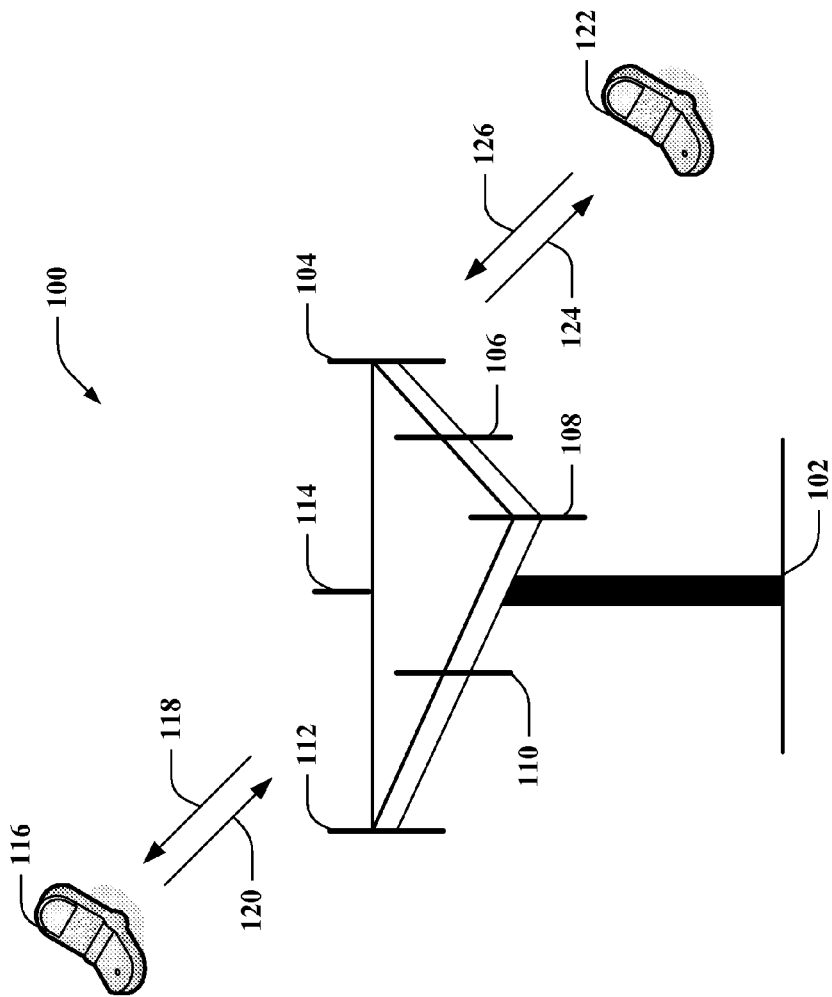
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. This can be provided by using a precoder to steer signals in desired directions, for example. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology in one example. According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like.

Figure 2:
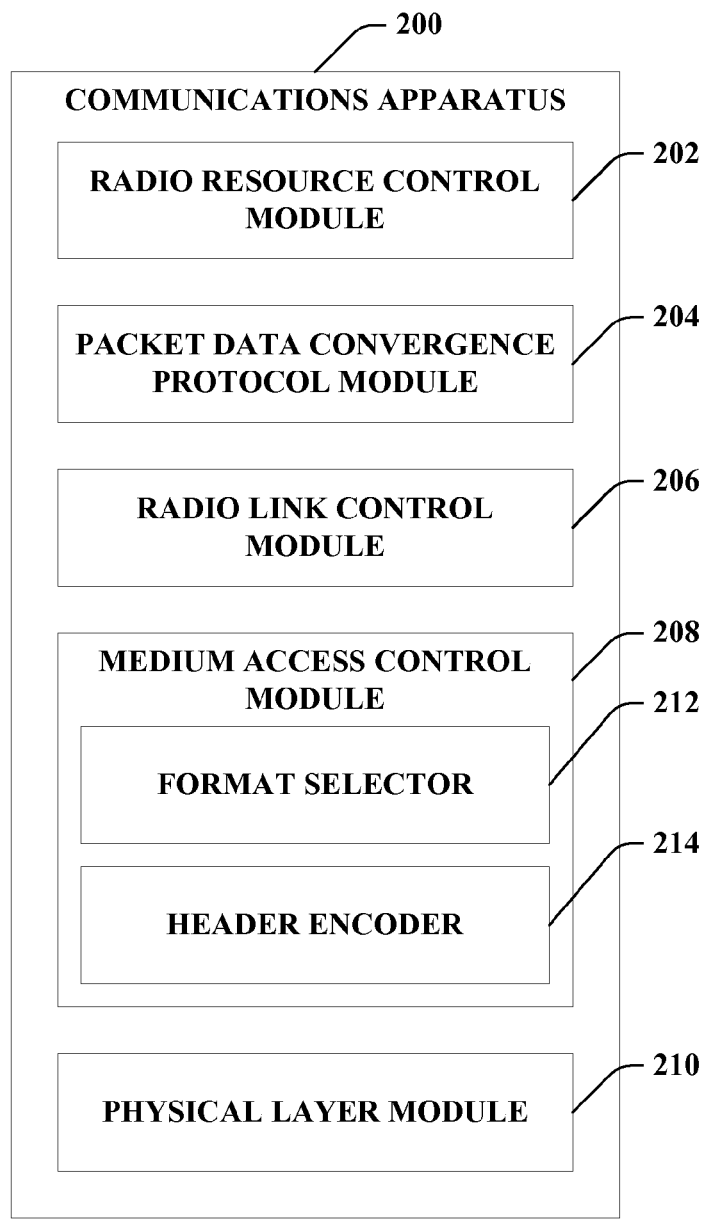
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. In communications systems, the communications apparatus 200 can employ components described below to enable variable medium access control header formats to be utilized.

The communications apparatus 200 can leverage protocols associated with a variety of protocol layers for communication. For instance, the communications apparatus 200 can a radio resource control (RRC) module 202 that can provide RRC protocol functionality. For example, the RRC module 202 can facilitate control plane signaling between mobile devices, base stations and a communications network. In addition, the RRC module 202 can perform configurational and operational operations such as, connection establishment and release, system information broadcast, bearer establishment, reconfiguration and release, connection mobility procedures, paging notification, power control, etc. The communications apparatus 200 also can include a packet data convergence (PDCP) module 204 that can manage the PDCP layer in wireless communications. For example, the PDCP module 204 can perform IP header compression and decompression, user data transfer, maintenance of sequence numbers for radio bearers and the like. Moreover, the communications apparatus 200 can further include a radio link control (RLC) module 206 that provides RLC protocol functionality. The communications apparatus can also include a medium access control (MAC) module 208 that can facilitate access to a shared medium. In addition, the communications apparatus 200 can include a physical layer module 210 that can manage and control the radio interface employed to transmit and receive signals.

The PDCP module 204, the RLC module 202 and the MAC module 206 can generate and/or pack information into headers, packets, payloads, protocol data units (PDUs), etc. associated with the respective protocols. Pursuant to an example, the MAC module 206 can employ a variety of header formats depending on type of data transmitted (e.g., user or control), size of higher layer PDUs, purpose of the MAC PDU (e.g., pad PDU) and the like. Accordingly, the communications apparatus 200 can include a format selector 212 that determines an appropriate MAC header format based upon transmission needs of the communications apparatus 200. For example, if the communications apparatus 200 transmits control data, the format selector 212 can determine an appropriate format for control data. The communications apparatus 200 can further include a header encoder 214 that can generate a MAC header according to the format selected by the format selector 212.

In one illustration, a MAC header can contain a variety of information such, but not limited to, a logical channel identifier (LCID) that can specify at least one of a logical channel to which to route the MAC PDU, a length field that specifies a length of the MAC service data unit (e.g., the MAC PDU or payload), and an extension field. In another aspect, the LCID can indicate the MAC header format employed. In addition, a variable length field can employed to accommodate a wide range of MAC PDU sizes. A variable length field enables a small length field to be utilized with small MAC PDUs and a larger length field for larger MAC PDUs, thus minimizing unnecessary overhead. Variable length can result from variable size PDCP or RLC PDUs encapsulated in a MAC PDU. To enable direct delivery of upper layer control messages, the MAC header can additionally include a field that identifies type of encapsulated PDU (e.g., RLC or PDCP). Further, the MAC header can include specific indicators that specify padding.

Pursuant to an illustrative embodiment, the above aspects can be specified in a several MAC header format designs categorized by LCID values. For instance, as described in more detail below, an LCID value of '11111' can indicate an associated MAC PDU is padding. In addition, an LCID value of '00000' can indicate the MAC header is utilized with control data. Any value between '11111' and '00000' can be reserved for user data.

Moreover, although not shown, it is to be appreciated that communications apparatus 200 can include memory that retains instructions associated with identifying a type of MAC header required for a transmission, encoding the MAC header information according to the selected format, identifying a particular MAC format upon receipt and the like. In addition, the memory can retain instructions for directly delivery upper layer control message encapsulated in MAC PDUs. Further, communications apparatus 200 may include a processor that may be utilized in connection with executing instructions (e.g., instructions retained within memory, instructions obtained from a disparate source, . . . ).

Figure 3:
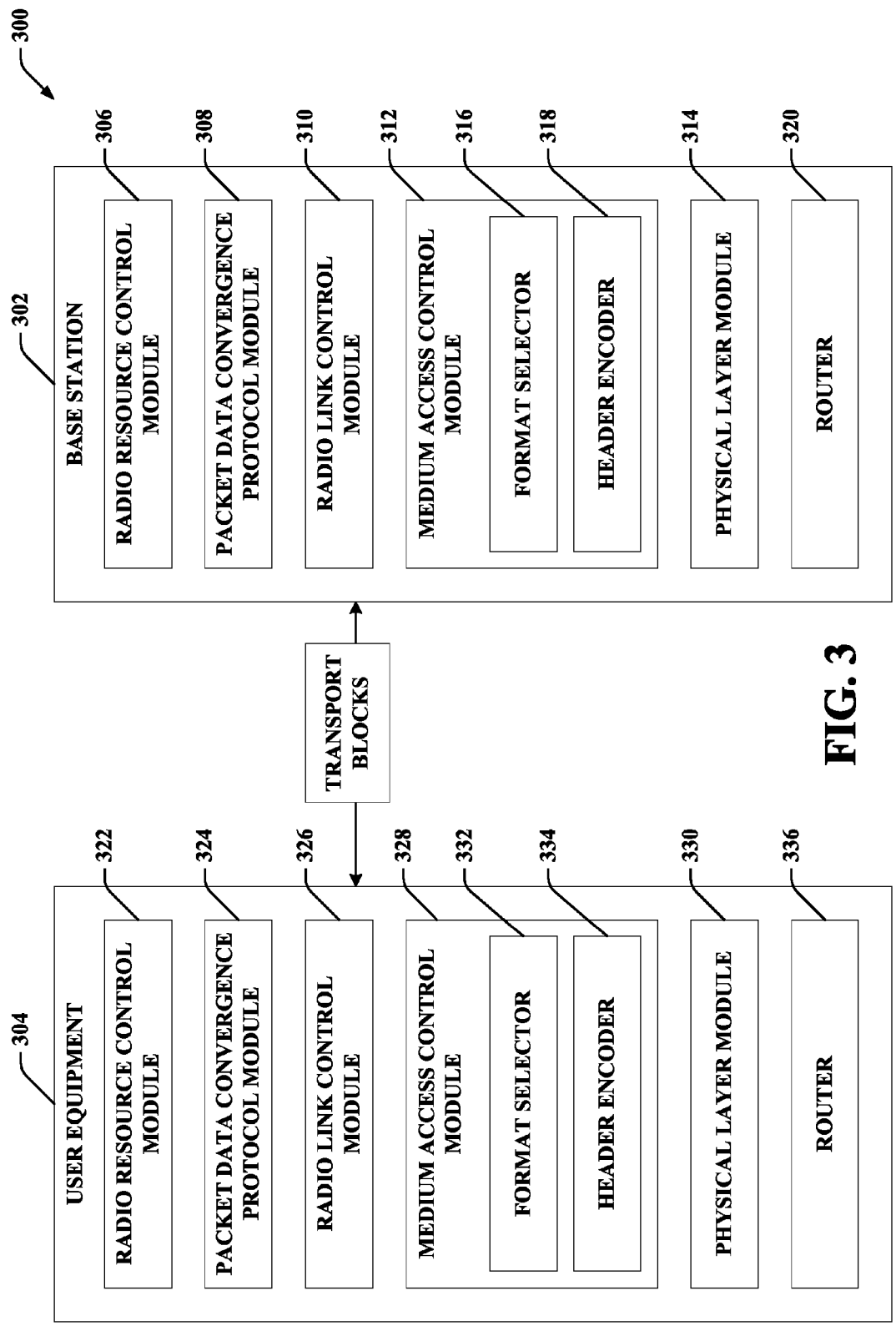
FIG. 3 is an illustration of an example wireless communications system that facilitates employing a variety of MAC header formats that can include variable lengths.

Now referring to FIG. 3, illustrated is a wireless communications system 300 that facilitates employing a variety of MAC header formats that can include variable lengths. The system 300 includes a base station 302 that can communicate with user equipment 304 (and/or any number of disparate devices (not shown)). The base station 302 can transmit information to the user equipment 304 over a forward link channel or downlink channel; further base station 302 can receive information from the user equipment 304 over a reverse link channel or uplink channel. Moreover, system 300 can be a MIMO system. Additionally, the system 300 can operate in an OFDMA wireless network (such as 3GPP, 3GPP2, 3GPP LTE, etc., for example). Also, the components and functionalities shown and described below in the base station 302 can be present in the user equipment 304 and vice versa, in one example.

The base station 302 can include a protocol stack, as described above with reference to FIG. 2, with a radio resource control (RRC) module 306, a packet data convergence protocol (PDCP) module 308, a radio link control (RLC) module 310, a medium access control (MAC) module 312, and a physical layer module 314. It is to be appreciated that the base station 302 can include any suitable number of protocol layers and the subject innovation is not limited to the protocol layers described herein. In addition, the base station 302 can include a format selector 316 that determines a MAC header format to employ for a transmission from among a plurality of formats. For instance, the format selector 316 can determine that user data is to be transmitted and selects a format appropriate for user data. In another example, the format selector 316 can determine that control data is to be transmitted and chooses a control data MAC header format. In addition, the format selector 316 can determine that a padding header format should be employed. The base station 302 can further include a header encoder 318 that generates a MAC header in accordance with the format selected by the format selector 316. In addition, the base station 302 can include a router 320 that can that can automatically evaluate a received MAC header in order to communicate data to a protocol layer within the base station 302 as defined by such MAC header. For instance, a control data MAC header can be received that indicates a RLC PDU is encapsulated. The router 320 can directly deliver the RLC PDU to the RLC module 310 to provide better quality of service treatment for the PDU.

The user equipment 304 can include a protocol stack, as described above with reference to FIG. 2, with a radio resource control (RRC) module 322, a packet data convergence protocol (PDCP) module 324, a radio link control (RLC) module 326, a medium access control (MAC) module 328, and a physical layer module 330. It is to be appreciated that the user equipment 304 can include any suitable number of protocol layers and the subject innovation is not limited to the protocol layers described herein. In addition, user equipment 304 can include a format selector 332 that determines a MAC header format to employ for a transmission from among a plurality of formats. For instance, the format selector 332 can determine that user data is to be transmitted and selects a format appropriate for user data. In another example, the format selector 332 can determine that control data is to be transmitted and chooses a control data MAC header format. In addition, the format selector 332 can determine that a padding header format should be employed. The user equipment 304 can further include a header encoder 334 that generates a MAC header in accordance with the format selected by the format selector 332. In addition, the user equipment 304 can include a router 336 that can that can automatically evaluate a received MAC header in order to communicate data to a protocol layer within the user equipment 304 as defined by such MAC header. For instance, a control data MAC header can be received that indicates a RLC PDU is encapsulated. The router 336 can directly deliver the RLC PDU to the RLC module 326 to provide better quality of service treatment for the PDU. While the format selectors 316 and 332 and the header encoders 318 and 334 are shown as part of the MAC modules 312 and 328, respectively, it is to be appreciated that the format selectors and header encoders can be separate modules or components and/or associated with other modules depicted in FIG. 3.

It is to be appreciated that a MAC header created by the format selector 332 and header encoder 334 within the user equipment 304 can be transmitted to the base station 302. The MAC header can be evaluated by the router 320 in order to directly transport data to a particularly defined protocol layer within the base station 302 (e.g., thereby bypassing at least one protocol layer above the MAC module 312). It is to be further appreciated that a MAC header created by the format selector 316 and header encoder 318 within the base station 302 can be communicated to the user equipment 304. The MAC header can be evaluated by the router 336 in order to directly transport data to a particularly defined protocol layer within the user equipment 304.

The MAC headers can include variable lengths that can efficiently encapsulate other layer PDUs without unnecessary overhead. The variable header format provides a plurality of benefits. For example, a no length option is available that can be utilized in Voice over IP (VoIP) packets that fit right into a transport block (e.g., a block of information transmitted between base station 302 and user equipment 304). With VoIP packets, a one byte MAC header can suffice. Other MAC header options include a variable length field to handle variable sized RLC PDUs on the fly. In addition, the MAC header can include a field that allows upper layers to access the MAC layer directly to deliver control PDUs. Moreover, the field provides visibility of the control PDUs to a scheduler to enable the scheduler to give those PDUs better quality of service treatment as opposed to multiplexing control PDUs and data PDUs on the a same radio bearer.

Figure 4:
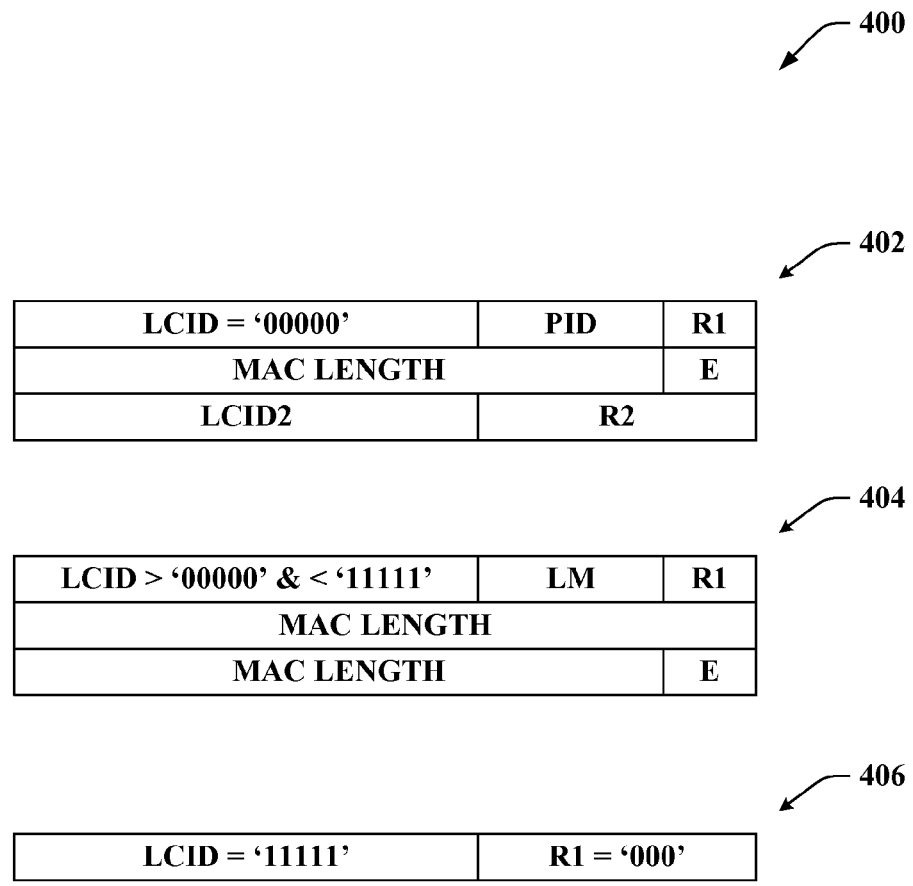
FIG. 4 is an illustration of example MAC header formats in accordance with an aspect of the subject disclosure.

FIG. 4 illustrates example MAC header formats 400 in accordance with an aspect of the subject disclosure. The formats described herein can be selected by the format selector 212, 316 and 332 and generated by the header encoder 214, 318 and 334. Format 402 is an exemplary format associated with control data. Format 402 includes a logical channel identifier (LCID) value of '00000' to identify the header as a control data header. The format 402 can further include a protocol identifier (PID) field that can specify a protocol layer associated with an encapsulated protocol data unit (PDU). Pursuant to an illustrative example, the PID field can have a value of '00' to indicate an encapsulated MAC control PDU, '01' to indicate an encapsulated RLC control PDU, and '10' to indicate an encapsulated PDCP control PDU. It is to be appreciated that other PID value encodings can be utilized. The format 402 can further include two reserved fields, a 1 bit reserved field (R1) and a three bit reserved field (R2). In addition, a bit extension field (E) can be included. In one aspect, the E field can be utilized to indicate additional fields are appended to the MAC header. In format 402, a seven bit MAC length field can be included that specifies the length of a MAC PDU payload associated with the header. A second level LCID (LCID2) is provided in format 402 to indicate to which logical channel to route the PDU. In one aspect, the LCID2 field can comprise five bits of information.

Format 404 is an exemplary format that can be employed to transmit user data. Format 404 can include a LCID field value greater than '00000' and less than '11111' to identify the header as a user data header. Format 404 can further include a length of MAC length field (LM) that indicates a size of the MAC Length field. For instance, a LM value of '00' can specify that no MAC length field is present (e.g., length is provided by the physical layer). A LM value of '01' can indicate a 7-bit MAC length is included in the header followed by a 1-bit E field. A LM value of '10' can specify a 15-bit MAC length field followed by a 1-bit E field. The format 404 can also include a 1-bit reserved field (R1). In FIG. 4, format 404 is depicted with a 15-bit MAC length field. However, it is to be appreciated that other MAC lengths can be employed as described above.

Format 406 is an exemplary format that can be utilized for padding. Format 406 can include a LCID field value of '11111' to identify the header as a padding header for a MAC pad PDU. To result in an 8-bit header, a 3-bit reserved field (R1) can be included. In one example, the R1 field is encoded with a value of '000'.

Figure 5:
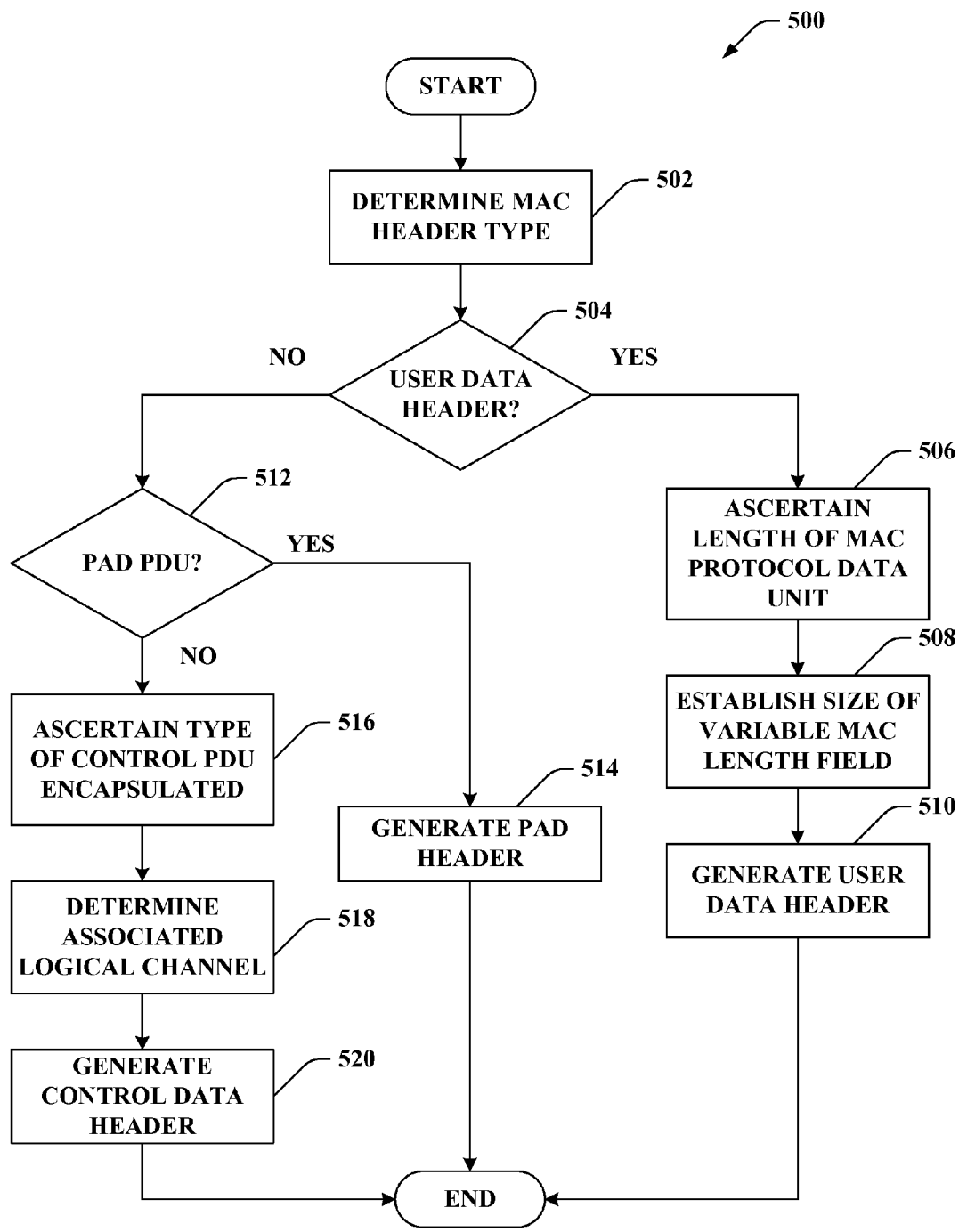
FIG. 5 is an illustration of an example methodology that facilitates selecting and generating a MAC header in accordance with an aspect of the subject disclosure.
Figure 6:
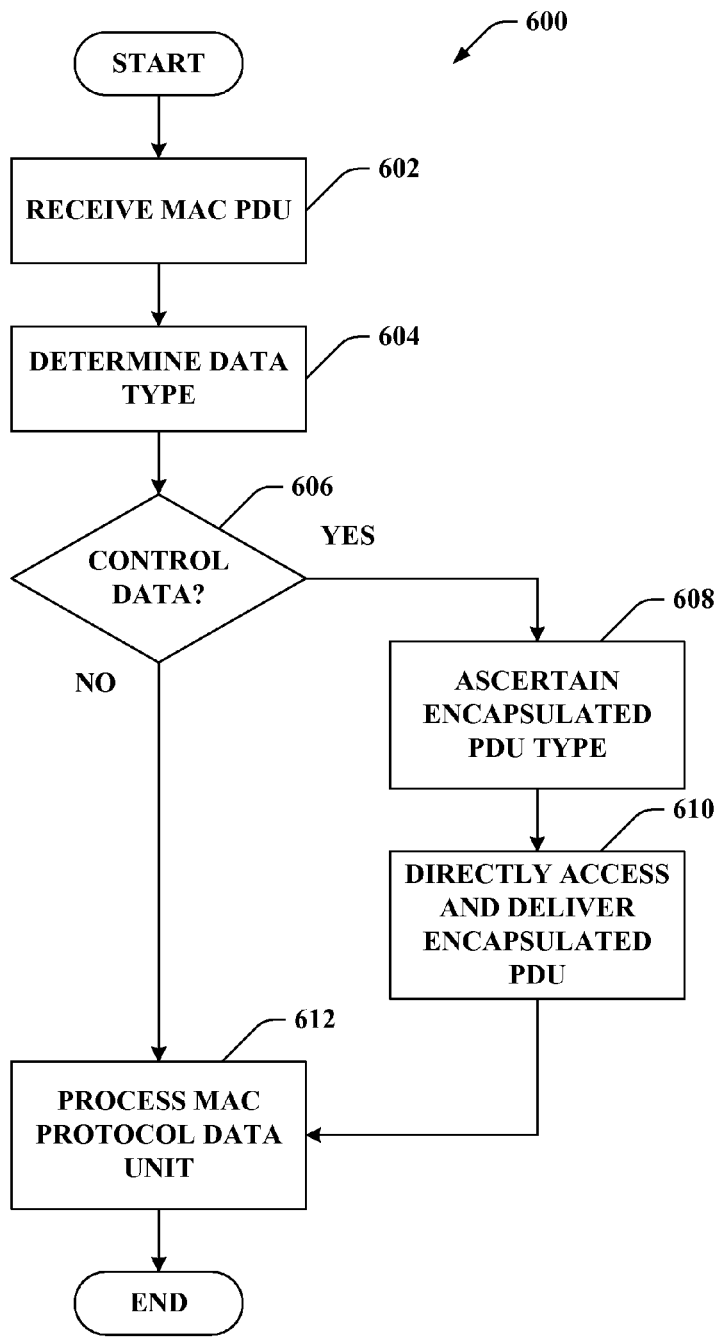
FIG. 6 is an illustration of an example methodology that facilitates that facilitates receiving MAC headers in accordance with an aspect.

Referring to FIGS. 5-6, methodologies relating to employing variable length MAC header formats in wireless communications that are designed specifically for the type of data encapsulated therein. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates selecting and generating a MAC header in accordance with an aspect of the subject disclosure. In one example, the method 500 can be employed by a base station (e.g., NodeB, evolved NodeB, access point, . . . ) to transmit data to mobile devices and/or by a mobile device to transmit data to a base station. At reference numeral 502, a MAC header type is determined. For example, the MAC header type can be a control data header, a user data header, or a padding header. At reference numeral 504, a decision is made as to whether the header is a user data header. If the header is user data, the method 500 proceeds to reference numeral 506 where a length of MAC protocol data unit is ascertained. For instance, the size of the payload is determined. At reference numeral 508, a size of the variable MAC length field in the header is established. For example, the size of the MAC length field will correlated to the length of the MAC PDU such that a small MAC length field is established for small PDUs and a larger MAC length field is employed with larger PDUs. Pursuant to an illustration, the size of the variable MAC length field can be one of no bits, 7 bits or 15 bits. At reference numeral 510, a user data header is generated according to a MAC length field and a size of MAC length field.

If the header is determined to not user data at 504, the method 500 proceeds to reference numeral 512, a decision is made as to whether the protocol data unit is a pad PDU. If yes, the method 500 proceeds to reference numeral 514 where a pad header is generated. If no, the method 500 proceeds to reference numeral 516 where a type of control PDU to be encapsulated in the MAC PDU is ascertained. In one example, the encapsulated control PDU can be a MAC control PDU, a RLC control PDU or a PDCP control PDU. At reference numeral 518, a logical channel associated with the header is determined. For instance, the logical channel can be a channel to which the MAC PDU is to be routed. At reference numeral 520, a control data header is generated that include a field that specifies the type of control PDU and a field that indicates the logical channel.

Referring now to FIG. 6, illustrated is a methodology 600 that facilitates receiving MAC headers in accordance with an aspect. In particular, the method 600 can be employed by a base station and/or a mobile device to receive and process variable length MAC headers specially designed for data type. At reference numeral 602, a MAC PDU and header is received. At reference numeral 604, a data type associated with the MAC PDU and header is determined. For example, the MAC PDU can be a control data PDU, a user data PDU or a pad PDU. At reference numeral 606, a decision is made as to whether the PDU is control data. If yes, the method 600 proceeds to reference numeral 608 where an encapsulated PDU type is ascertained For instance, the encapsulated PDU can be a MAC control PDU, a PDCP control PDU or a RLC control PDU. At reference numeral 510, the MAC is directly accessed and the encapsulated PDU is directly delivered to the protocol layer associated with the encapsulated PDU. For example, if the PDU is a PDCP PDU, the encapsulated PDU is directly delivered to a PDPC protocol layer module. At reference numeral 612, the MAC PDU is processed. For example, the PDU can be processed by a MAC layer module, partially processed by a MAC layer and passed to upper layers and/or passed directly to upper layers.

It will be appreciated that, in accordance with one or more aspects described herein, inferences can be made regarding selecting an appropriate MAC header format, determining a protocol associated with an encapsulated PDU, ascertaining a type of header, and the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 7:
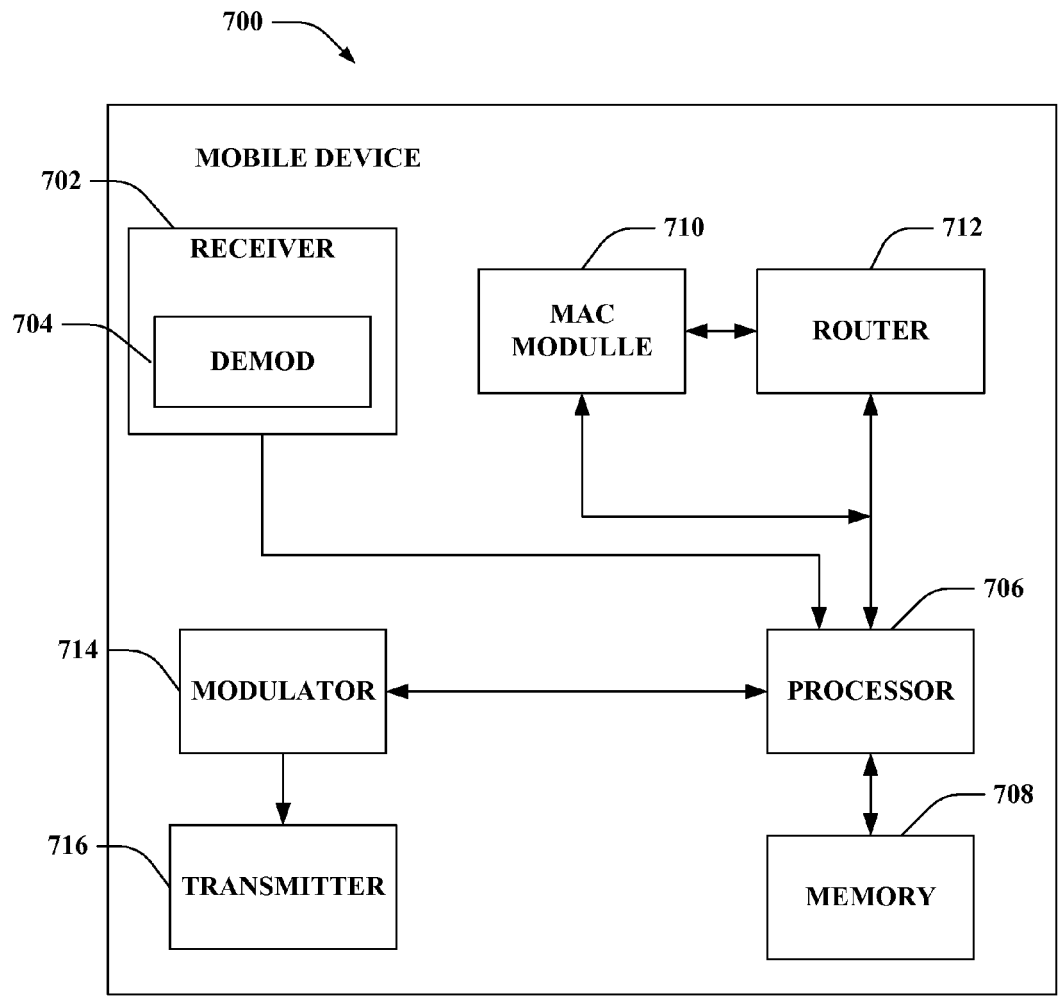
FIG. 7 is an illustration of an example system that facilitates employing a variety of medium access control (MAC) headers in accordance with an aspect of the subject disclosure.

FIG. 7 is an illustration of a mobile device 700 that facilitates employing a variety of medium access control (MAC) headers in accordance with an aspect of the subject disclosure. The mobile device 700 can facilitate communications associated with a mobile device in a wireless communication system in accordance with an aspect of the disclosed subject matter. It is to be appreciated that the mobile device 700 can be the same or similar as, and/or can comprise the same or similar functionality as, mobile device 116, 122, 200, and/or 304 as more described, for example, with regard to system 100, system 200, system 300, methodology 500, and methodology 600.

Mobile device 700 comprises a receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can be, for example, an MMSE receiver, and can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700. Mobile device 700 can also comprise a modulator 714 that can work in conjunction with the transmitter 716 to facilitate transmitting signals (e.g., data) to, for instance, a base station (e.g., 102, 200, 302), another mobile device (e.g., 122), etc.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.). Further, memory 708 can retain prioritized bit rates, maximum bit rates, queue sizes, etc., related to one or more bearers serviced by the mobile device 700.

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 706 can be operatively coupled to a MAC module 710 that can facilitate operations associated with a medium access control protocol. In addition, the MAC module 710 can select a MAC header format based upon type of data to be transmitted by the mobile device 700. For instance, the MAC module 710 can employ unique formats for control data, user data and padding. Processor 706 can further be coupled to a router 712 that can directly access MAC layer PDUs upon receipt by the mobile device 700. The router 712 can determine if the MAC layer PDU encapsulates an upper layer PDU and directly deliver the encapsulated PDU to the upper layer. Mobile device 700 still further comprises a modulator 714 and transmitter 716 that respectively modulate and transmit signals to, for instance, a base station, another mobile device, etc. Although depicted as being separate from the processor 706, it is to be appreciated that the MAC module 710, router 712, demodulator 704, and/or modulator 714 can be part of the processor 706 or multiple processors (not shown).

Figure 8:
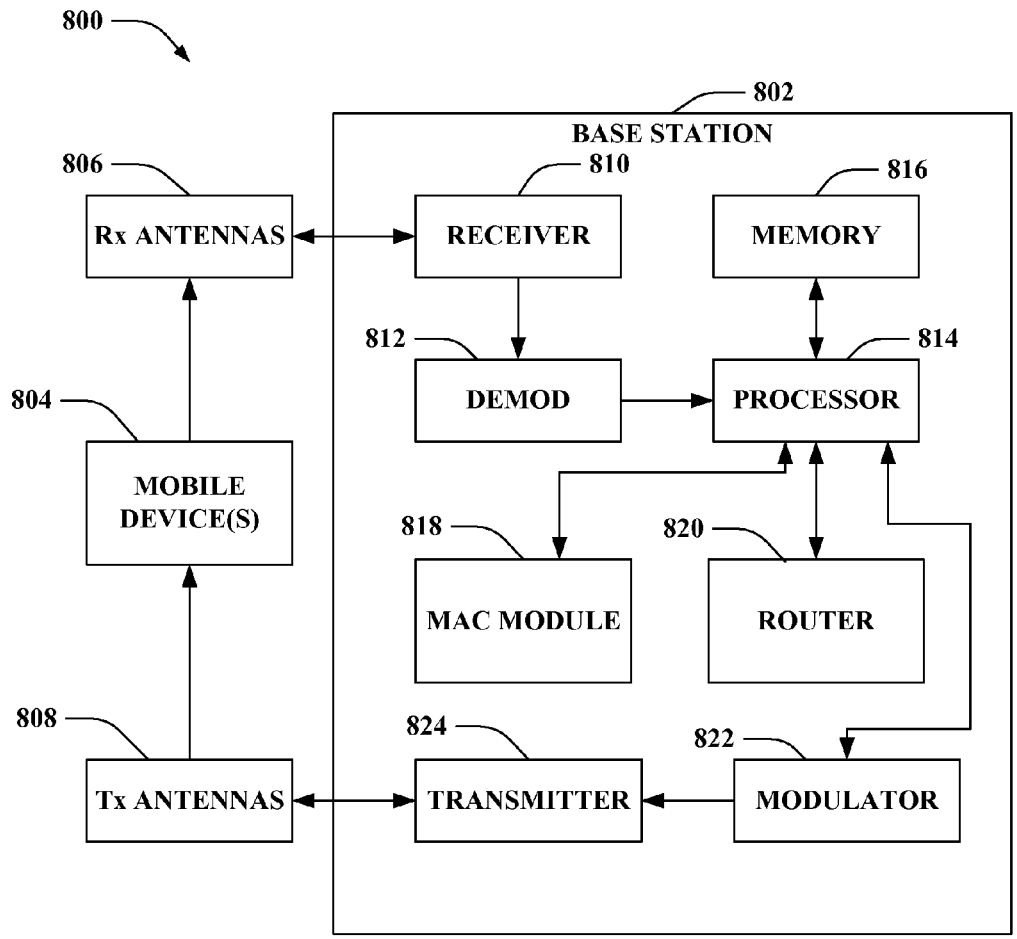
FIG. 8 is an illustration of an example system that facilitates communications associated with a mobile device in a wireless communication system in accordance with an aspect of the disclosed subject matter

FIG. 8 is an illustration of a system 800 that can facilitate communications associated with a mobile device in a wireless communication system in accordance with an aspect of the disclosed subject matter. The system 800 comprises a base station 802 (e.g., access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can that can be a processor dedicated to analyzing information received by receiver 810, generating information for transmission by a transmitter 824, a processor that controls one or more components of base station 802, and/or a processor that concurrently analyzes information received by receiver 810, generates information for transmission by transmitter 824, and controls one or more components of base station 802. In addition, the processor 814 can be similar to the processor described above with regard to FIG. 6, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein.

In addition, the memory 816 can store data to be transmitted, received data, information related to available channels, data associated with analyzed signal and/or interference strength, information related to an assigned channel, power, rate, or the like, and any other suitable information for estimating a channel and communicating via the channel. Memory 816 can additionally store protocols and/or algorithms associated with estimating and/or utilizing a channel (e.g., performance based, capacity based, etc.). The base station 802 can also comprise a modulator 822 that can work in conjunction with the transmitter 824 to facilitate transmitting signals (e.g., data) to, for instance, mobile devices 804, another device, etc.

It will be appreciated that the memory 816 described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Processor 814 is further coupled to a MAC module 818 that can facilitate operations associated with a medium access control protocol. In addition, the MAC module 818 can select a MAC header format based upon type of data to be transmitted by the base station 802. For instance, the MAC module 818 can employ unique formats for control data, user data and padding. Processor 814 can further be coupled to a router 820 that can directly access MAC layer PDUs upon receipt by the base station 802. The router 820 can determine if the MAC layer PDU encapsulates an upper layer PDU and directly deliver the encapsulated PDU to the upper layer. Furthermore, although depicted as being separate from the processor 814, it is to be appreciated that the MAC module 818, router 820, demodulator 812, and/or modulator 822 can be part of the processor 814 or multiple processors (not shown).

Figure 9:
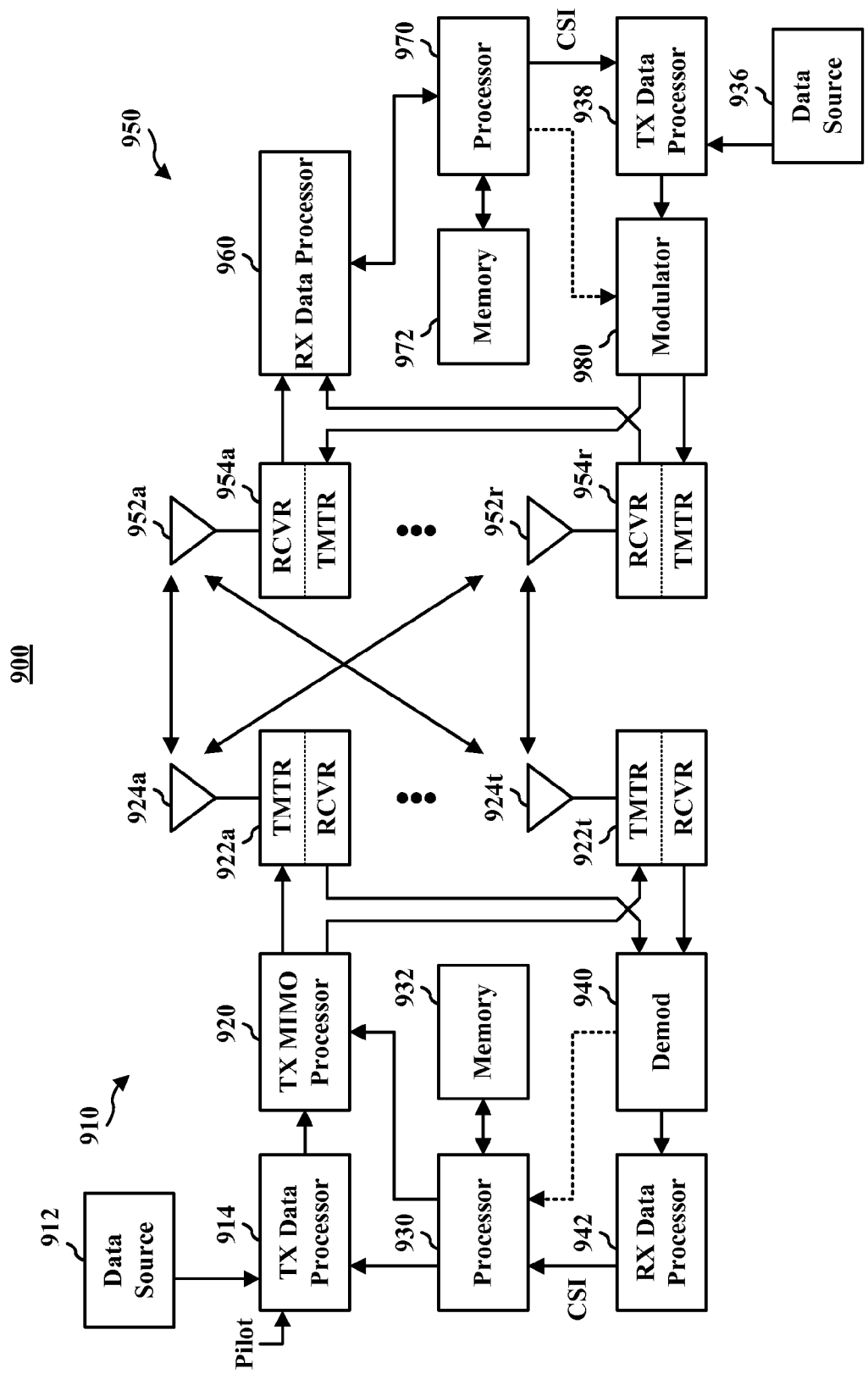
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8), examples (FIG. 4) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 1720 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
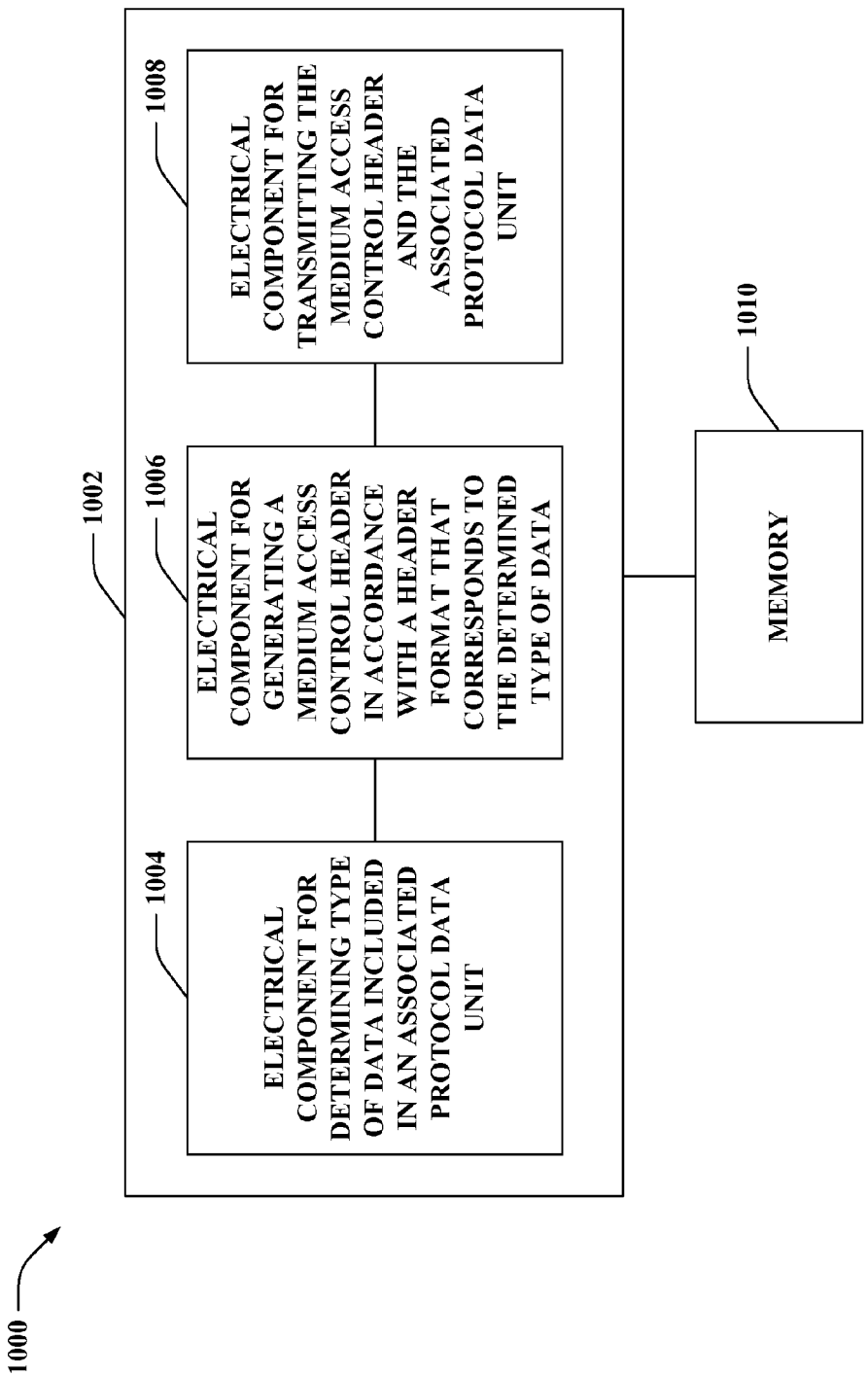
FIG. 10 is an illustration of an example system that determines a header format to employ in transmitting data in a wireless communication system.

With reference to FIG. 10, illustrated is a system 1000 that determines a header format to employ in transmitting data in a wireless communication system. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for determining type of data included in an associated protocol data unit 1004. Further, logical grouping 1002 can comprise an electrical component for generating a medium access control header in accordance with a header format that corresponds to the determined type of data 1006. Moreover, logical grouping 1002 can comprise an electrical component for transmitting the medium access control header and the associated protocol data unit 1008. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Figure 11:
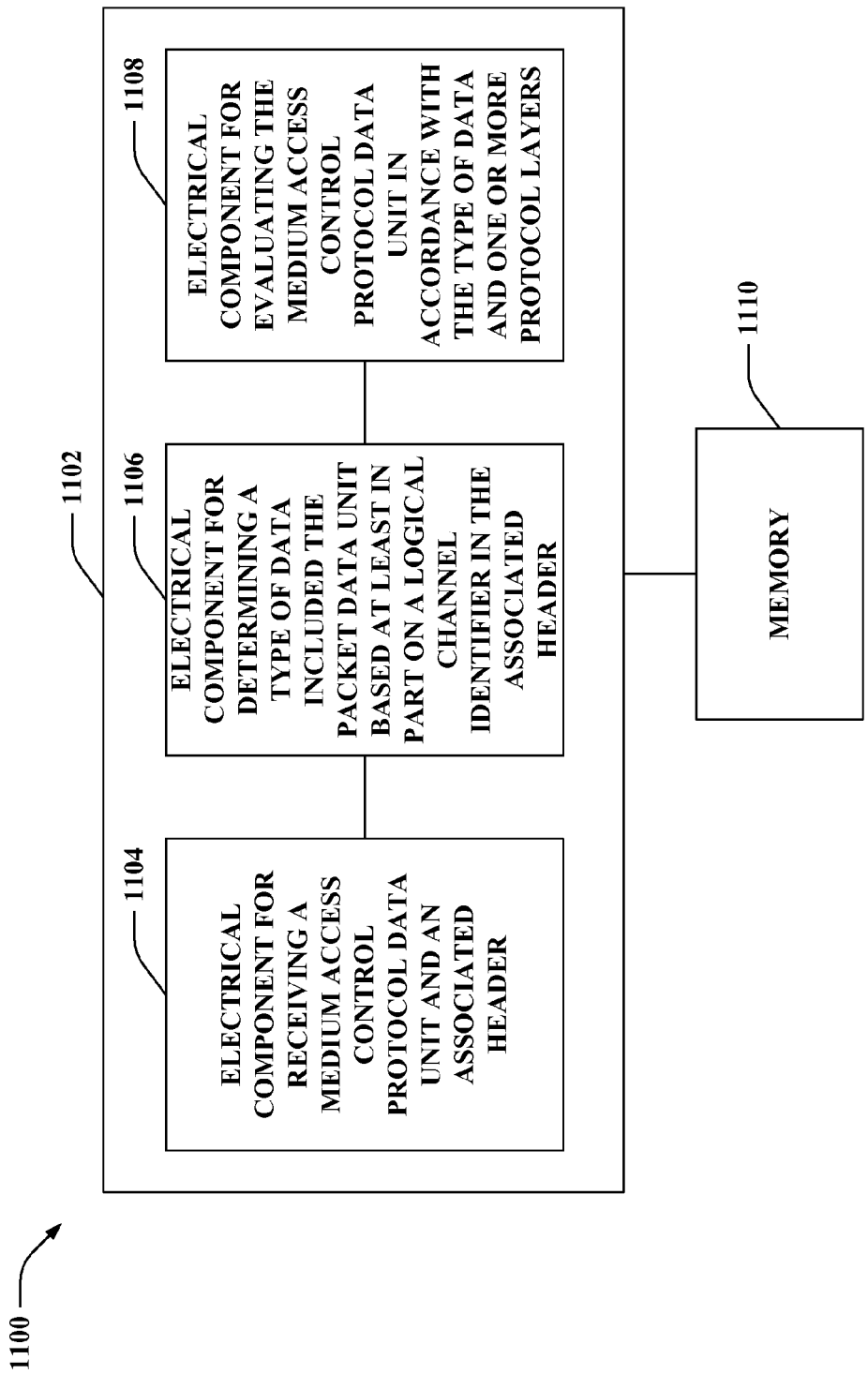
FIG. 11 is an illustration of an example system that facilitates receiving transmissions that include variable medium access control header formats.

With reference to FIG. 11, illustrated is a system 1100 that facilitates receiving transmissions that include variable medium access control header formats. For example, system 1100 can reside at least partially within a base station, mobile device, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for receiving a medium access control protocol data unit and an associated header 1104. Further, logical grouping 1102 can comprise an electrical component for determining a type of data included the packet data unit based at least in part on a logical channel identifier in the associated header 1106. Moreover, logical grouping 1102 can comprise an electrical component for evaluating the medium access control protocol data unit in accordance with the type of data and one or more protocol layers 1108. Additionally, system 1100 can include a memory 1110 that retains instructions for executing functions associated with electrical components 1104, 1106, and 1108. While shown as being external to memory 1110, it is to be understood that one or more of electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of employing a plurality of medium access control header formats, comprising:
   determining a medium access control header format according to a type of data included in an associated medium access control payload;
   establishing a size of a medium access control length field of the determined medium access control header format, the size varying based at least in part on the associated medium access control payload;
   generating a medium access control header in accordance with the determined medium access control header format, the medium access control header comprising a logical channel identifier field, the medium access control length field, and a field indicating the size of the medium access control length field within the medium access control header; and
   transmitting the medium access control header and the associated medium access control payload.

2. The method of claim 1, in which the type of data includes one or more of control data, user data, pad data, or a combination thereof.

3. The method of claim 1, in which the header format corresponds to one or more of a control header, a user header, a pad header, or a combination thereof.

4. The method of claim 3, in which the control header comprises a first level logical channel identifier, a protocol identifier, and a second level logical channel identifier.

5. The method of claim 4, in which the protocol identifier specifies a protocol layer associated with a protocol data unit encapsulated in the associated medium access control payload.

6. The method of claim 5, in which the protocol identifier specifies one or more of a medium access control protocol data unit, a radio link control protocol data unit, a packet data convergence protocol data unit, or a combination thereof.

7. The method of claim 1, in which the medium access control length field comprises zero bits, seven bits, or fifteen bits.

8. The method of claim 3, the pad header comprises a logical channel identifier and a reserved field.

9. A communications apparatus utilizing variable medium access control headers, comprising:
   means for determining a medium access control header format according to a type of data included in an associated medium access control payload;
   means for establishing a size of a medium access control length field of the determined medium access control header format, the size varying based at least in part on the associated medium access control payload;
   means for generating a medium access control header in accordance with the determined medium access control header format, the medium access control header comprising a logical channel identifier field, the medium access control length field, and a field to indicate the size of the medium access control length field within the medium access control header; and
   means for transmitting the medium access control header and the associated medium access control payload.

10. The communications apparatus of claim 9, wherein the type of data includes one or more of control data, user data, pad data, or a combination thereof.

11. The communications apparatus of claim 9, wherein the header format corresponds to one or more of a control header, a user header, a pad header, or a combination thereof.

12. The communications apparatus of claim 11, wherein the control header comprises a protocol identifier and a second level logical channel identifier.

13. The communications apparatus of claim 12, wherein the protocol identifier specifies a protocol layer associated with a protocol data unit encapsulated in the associated medium access control payload.

14. The communications apparatus of claim 13, wherein the protocol identifier specifies one or more of a medium access control protocol data unit, a radio link control protocol data unit, a packet data convergence protocol data unit, or a combination thereof.

15. The communications apparatus of claim 9, wherein the medium access control length field comprises zero bits, seven bits, or fifteen bits.

16. The communications apparatus of claim 11, wherein the pad header comprises a logical channel identifier and a reserved field.

17. A wireless communications apparatus, comprising:
   a memory that retains instructions related to:
   determining a medium access control header format according to a type of data included in an associated medium access control payload, wherein the type of data includes one or more of control data, user data, pad data, or a combination thereof,
   establishing a size of a medium access control length field of the determined medium access control header format, the size varying based at least in part on the associated medium access control payload;
   generating a medium access control header in accordance with the determined medium access control header format, and
   transmitting the medium access control header and the associated medium access control payload, the medium access control header comprising a logical channel identifier field, the medium access control length field, and a field to indicate the size of the variable medium access control length field within the medium access control header; and
   a processor, coupled to the memory, configured to execute the instructions retained in the memory.

18. A computer program product including a non-transitory computer-readable medium having code stored thereon, comprising:
   code for causing at least one computer to determine a medium access control header format according to a type of data included in an associated medium access control payload, wherein the type of data includes one or more of control data, user data, pad data, or a combination thereof;
   code for causing at least one computer to establish a size of a medium access control length field of the determined medium access control header format, the size varying based at least in part on the associated medium access control payload;
   code for causing at least one computer to generate a medium access control header in accordance with the determined medium access control header format, the medium access control header comprising a logical channel identifier field, the medium access control length field, and a field to indicate the size of the medium access control length field within the medium access control header; and code for causing at least one computer to transmit the medium access control header and the associated medium access control payload.

19. A method of communicating with variable medium access control header formats, comprising:
   receiving a medium access control payload and an associated header;
   determining a type of data included in the medium access control payload based at least in part on a logical channel identifier in the associated header;
   evaluating the medium access control payload in accordance with the type of data and one or more protocol layers; and
   determining a size of a medium access control length field in the associated header based at least in part on a value of a field in the associated header indicating the size of the medium access control length field.

20. The method of claim 19, wherein the type of data includes one or more of a control data, user data, pad data, or a combination thereof.

21. The method of claim 20, further comprising ascertaining a protocol layer associated with an encapsulated control data unit for control data based at least in part on a protocol identifier included in a control data medium access control header.

22. The method of claim 21, further comprising directly delivering the encapsulated control data to the associated protocol layer.

23. A communications apparatus communicating with variable medium access control header formats, comprising:
   means for receiving a medium access control payload and an associated header;
   means for determining a type of data included in the medium access control payload based at least in part on a logical channel identifier in the associated header;
   means for evaluating the medium access control payload in accordance with the type of data and one or more protocol layers; and
   means for determining a size of a medium access control length field in the associated header based on a value of a field in the associated header indicating the size of the medium access control length field.

24. The communications apparatus of claim 23, wherein the type of data includes one or more of a control data, user data, pad data, or a combination thereof.

25. The communications apparatus of claim 24, further comprising means for ascertaining a protocol layer associated with an encapsulated control data unit for control data based at least in part on a protocol identifier included in a control data medium access control header.

26. The communications apparatus of claim 25, further comprising means for directly delivering the encapsulated control data to the associated protocol layer.

27. A wireless communications apparatus, comprising:
   a memory that retains instructions related to:
   receiving a medium access control payload and an associated header,
   determining a type of data included in the medium access control payload based at least in part on a logical channel identifier in the associated header, wherein the type of data can be one or more of control data, user data, pad data, or a combination thereof,
   evaluating the medium access control payload in accordance with the type of data and one or more protocol layers, and
   determining a size of a medium access control length field in the associated header based at least in part on a value of a field in the associated header indicating the size of the medium access control length field; and
   a processor, coupled to the memory, configured to execute the instructions retained in the memory.

28. A computer program product including a non-transitory computer-readable medium having code stored thereon, comprising:
   code for causing at least one computer to receive a medium access control payload and an associated header;
   code for causing at least one computer to determine a type of data included in the medium access control payload based at least in part on a logical channel identifier in the associated header wherein the type of data can be one or more of control data, user data, pad data, or a combination thereof;
   code for causing at least one computer to evaluate the medium access control payload in accordance with the type of data and one or more protocol layers; and
   code for causing at least one computer to determine a size of a medium access control length field in the associated header based at least in part on a value of a field in the associated header indicating the size of the medium access control length field.

* * * * *